No. 731,376. PATENTED JUNE 16, 1903.
T. J. LITLE, JR.
APPARATUS FOR SUPPLYING AIR OR OTHER COMBUSTION SUPPORTING
FLUID OR SUBSTANCE TO GAS OR OTHER BURNERS.
APPLICATION FILED OCT. 1, 1900.

NO MODEL. 6 SHEETS—SHEET 1.

Attest:

Inventor:
Thomas J. Litle, Jr.,
By Howell Batts
Attorney

No. 731,376. PATENTED JUNE 16, 1903.
T. J. LITLE, Jr.
APPARATUS FOR SUPPLYING AIR OR OTHER COMBUSTION SUPPORTING FLUID OR SUBSTANCE TO GAS OR OTHER BURNERS.
APPLICATION FILED OCT. 1, 1900.
NO MODEL. 5 SHEETS—SHEET 2.

Attest:

Inventor:
Thomas J. Litle, Jr.,
By Howell Battle
Attorney

No. 731,376. PATENTED JUNE 16, 1903.
T. J. LITLE, Jr.
APPARATUS FOR SUPPLYING AIR OR OTHER COMBUSTION SUPPORTING
FLUID OR SUBSTANCE TO GAS OR OTHER BURNERS.
APPLICATION FILED OCT. 1, 1900.

NO MODEL. 5 SHEETS—SHEET 3.

Attest:
C. A. Neal
E. A. Pinciel

Inventor:
Thomas J. Litle, Jr.
By Novell Litle
Attorney

No. 731,376. PATENTED JUNE 16, 1903.
T. J. LITLE, Jr.
APPARATUS FOR SUPPLYING AIR OR OTHER COMBUSTION SUPPORTING FLUID OR SUBSTANCE TO GAS OR OTHER BURNERS.
APPLICATION FILED OCT. 1, 1900.
NO MODEL. 5 SHEETS—SHEET 4.
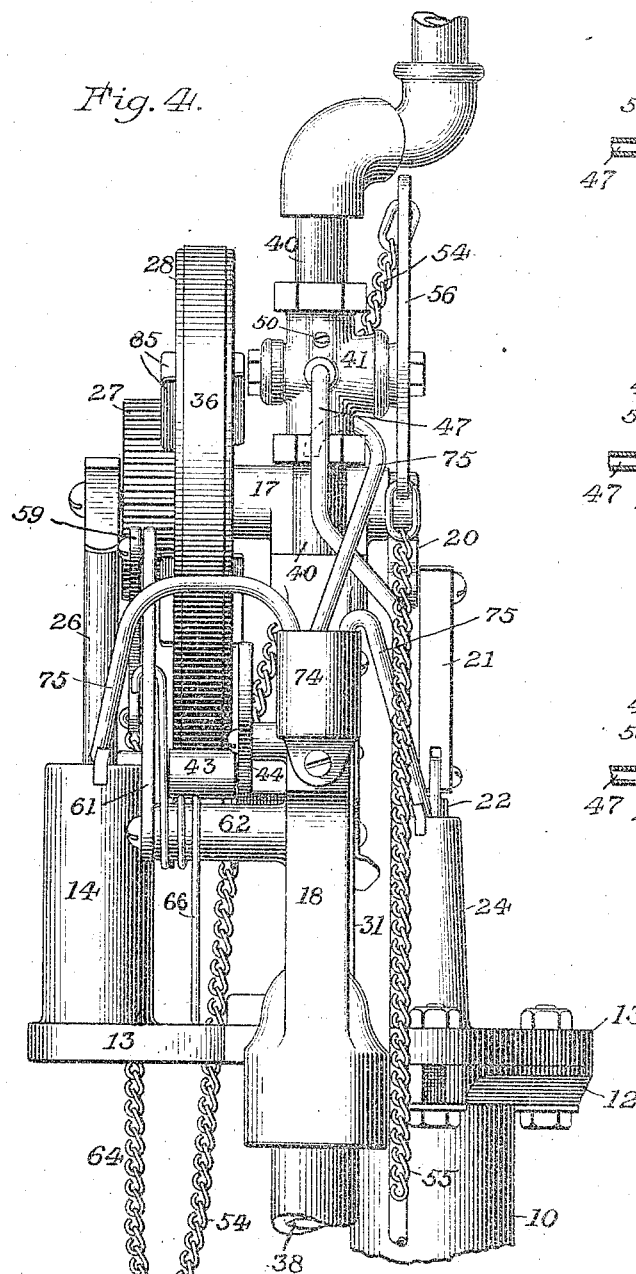
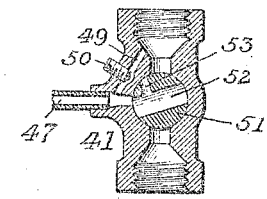
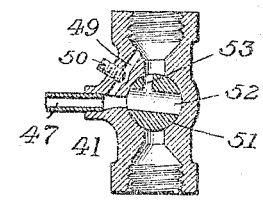
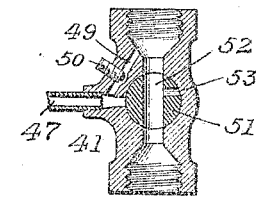

No. 731,376. PATENTED JUNE 16, 1903.
T. J. LITLE, JR.
APPARATUS FOR SUPPLYING AIR OR OTHER COMBUSTION SUPPORTING
FLUID OR SUBSTANCE TO GAS OR OTHER BURNERS.
APPLICATION FILED OCT. 1, 1900.
NO MODEL. 5 SHEETS—SHEET 5.
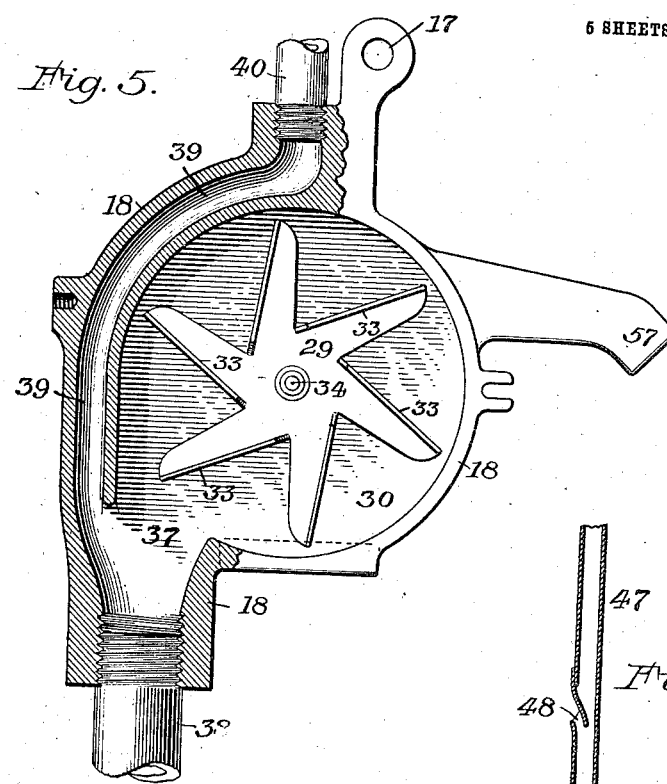
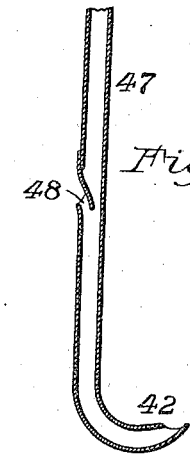
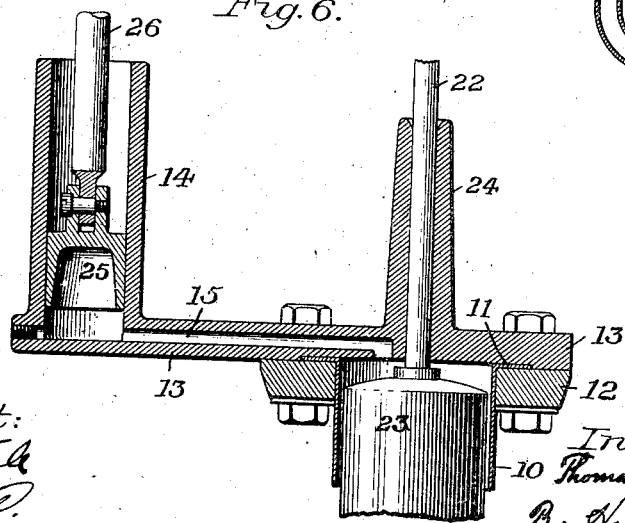
Attest:
Inventor:
Thomas J. Litle, Jr.
By Howell Battle
Attorney No. 731,376. Patented June 16, 1903.

UNITED STATES PATENT OFFICE.

THOMAS J. LITLE, JR., OF PHILADELPHIA, PENNSYLVANIA, ASSIGNOR TO THE NEW PROCESS LIGHTING COMPANY, OF CLEVELAND, OHIO, A CORPORATION OF OHIO.

APPARATUS FOR SUPPLYING AIR OR OTHER COMBUSTION-SUPPORTING FLUID OR SUBSTANCE TO GAS OR OTHER BURNERS.

SPECIFICATION forming part of Letters Patent No. 731,376, dated June 16, 1903.

Application filed October 1, 1900. Serial No. 31,694. (No model.)

*To all whom it may concern:*

Be it known that I, THOMAS J. LITLE, Jr., a citizen of the United States, residing at Philadelphia, in the county of Philadelphia and State of Pennsylvania, have invented new and useful Improvements in Apparatus for Supplying Air or other Combustion-Supporting Fluid or Substance to Gas or other Burners, of which the following is a specification.

In an application for Letters Patent filed by me August 6, 1900, Serial No. 26,039, I show and describe an apparatus for supplying air to gas or other burners for the purpose of increasing the lighting or heating power thereof. Said apparatus embodies a motor adapted to be operated by the heat from the burner and a device or mechanism driven by the motor for forcing air to the burner, the organization being such that air is supplied to the burner by power derived from the burner itself.

My present invention relates to improvements upon said apparatus; and it consists in certain novel features to be hereinafter described, and particularly pointed out in the claims hereunto annexed.

Figure 1:
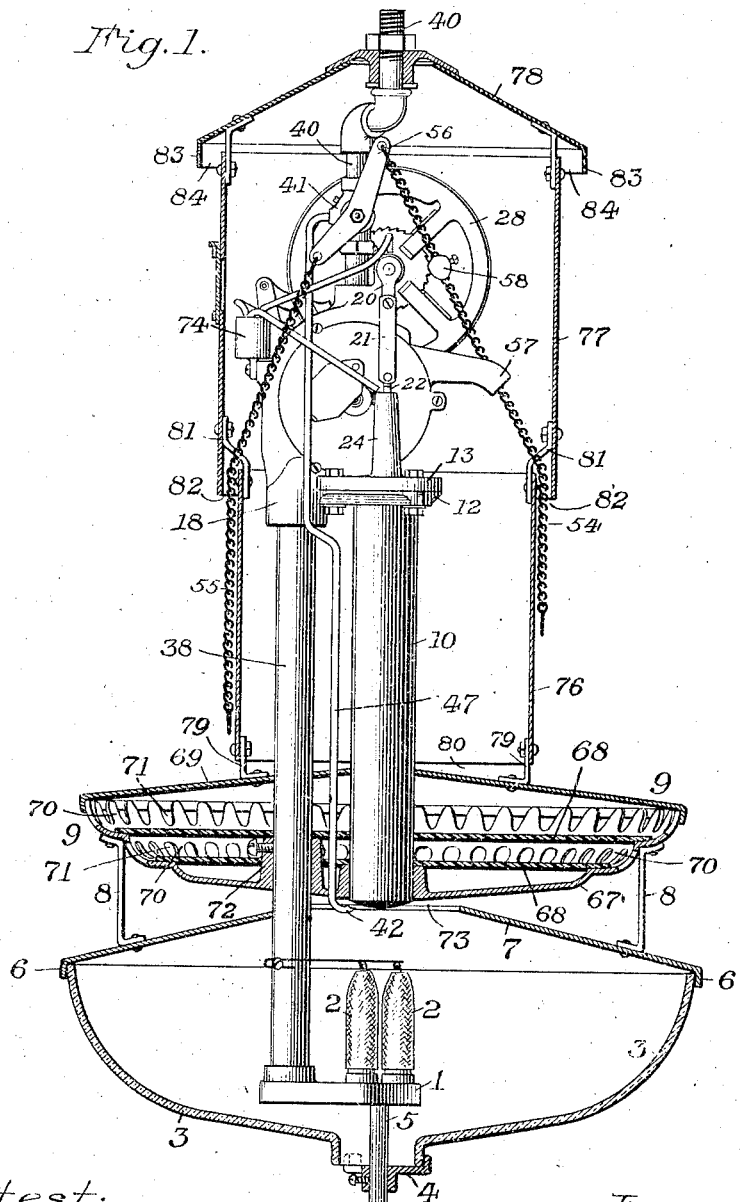
Figure 2:
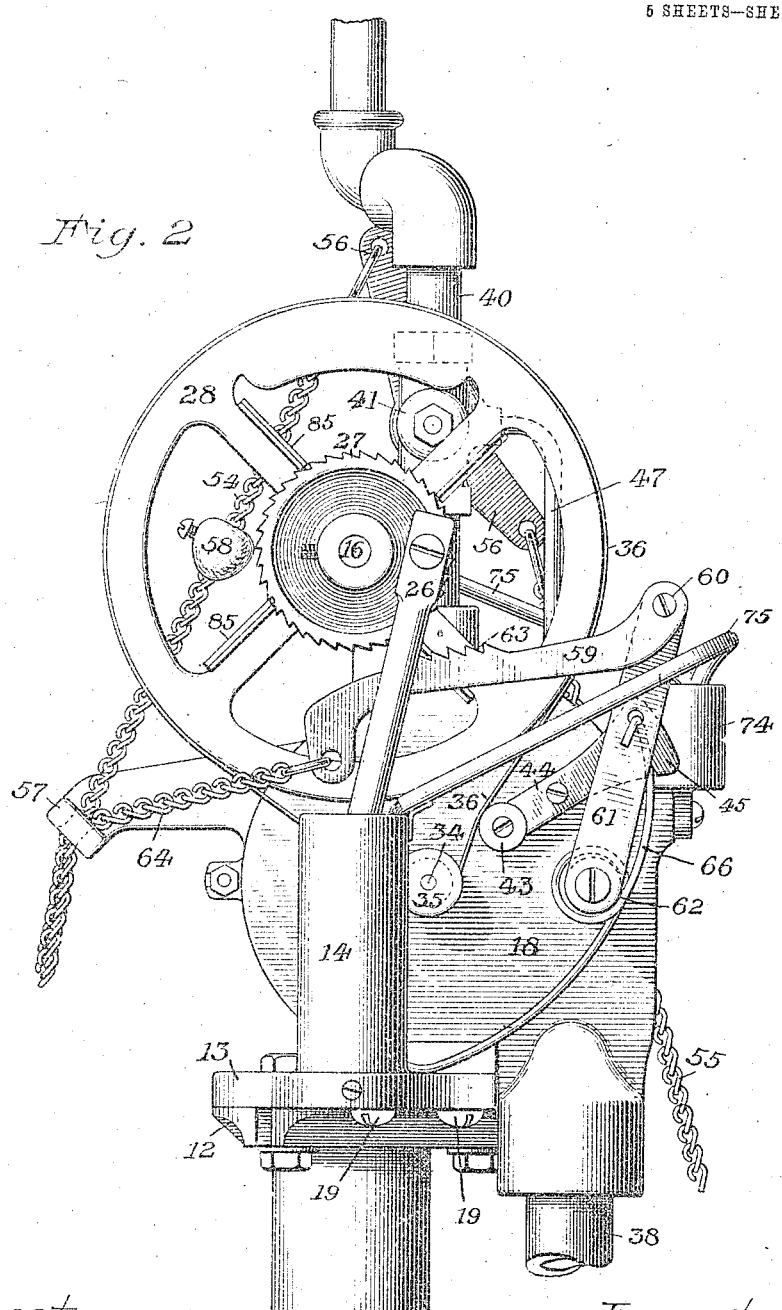
Figure 3:
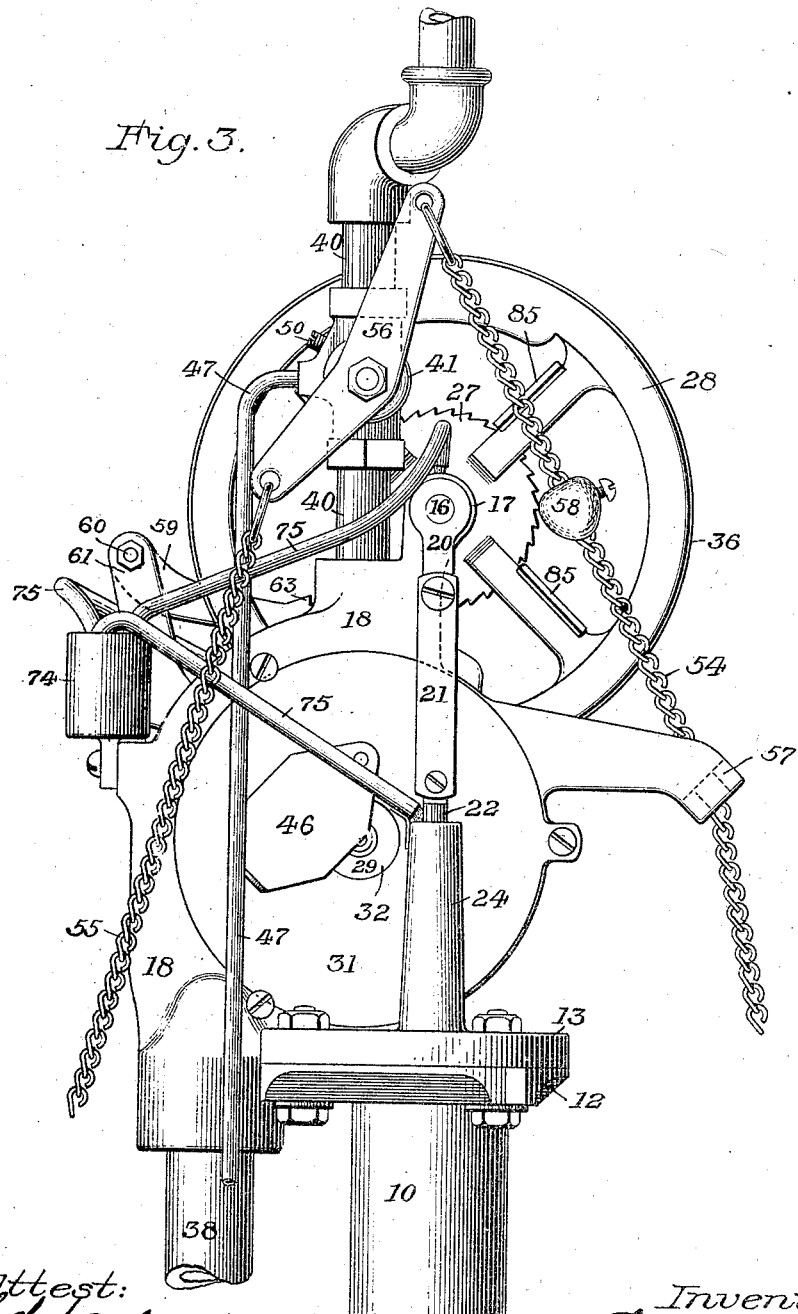

Referring to the drawings furnished and forming a part of this specification, Figure 1 is a vertical longitudinal section of an apparatus embodying my improvements. Figs. 2, 3, and 4 are enlarged views showing the main working portions of the apparatus in front, rear, and side elevations. Fig. 5 is a view of the blower or air-supplying device with the side cover removed and a portion of the outer casing broken away for disclosing the gas-passage to the burner. Fig. 6 is a detail of the motor. Fig. 7 is a sectional view of the burner employed for igniting the main burner and for initially heating the motor. Figs. 8, 9, and 10 are detail views of the cock for controlling the gas-supply.

The apparatus shown has been devised for street or other lighting purposes and is provided with a double burner 1, having two incandescing mantles 2 2. Said burner is inclosed within a globe 3, which is open at the bottom for the admission of air and supported by a "spider" 4, secured to a pendent rod 5, cast integral with the burner, as clearly shown in Fig. 1. The upper edge of the globe 3 is confined or held by a flange 6 at the edge of a conical reflector 7, arranged above the burner and suspended by hangers 8 from a heat-insulator 9, to be hereinafter referred to.

As heretofore indicated, my apparatus embodies as an essential feature a motor adapted to be operated by the heat from the burner to which air is to be supplied. The motor shown by me is a well-known type of caloric engine, in which air is expanded and contracted for furnishing the motive power by being alternately shifted from one end to the other of a cylinder whose ends are maintained at widely-different temperatures. Said engine will need no detail description as to its operation and will be described only as far as may be necessary to give a proper understanding of my invention.

The air expanding and contracting cylinder 10 of the motor is arranged directly above the burner 1 in position to receive heat therefrom, and it is made of sufficient length to insure a proper difference in temperature between its extreme ends. Said cylinder is made of sheet metal, which at the upper end of the cylinder is bent outwardly to form a flange 11, which is tightly clamped between a clamping-ring 12 and a casting 13, the latter closing the upper end of the cylinder, as shown in Fig. 6. The motor-cylinder 14 is cast integral with the casting 13, and at the bottom of said cylinder there is an air-passage 15 through the casting to the cylinder 10. The motor-shaft 16 is supported in a bearing 17, cast integral with a casting 18, forming the main walls of the air-supplying device and secured to the casting 13 by screws 19, though these parts 13 and 18 may be made in one casting, if desired. At one end of shaft 16 is a crank 20, which is connected by link 21 and rod 22 to the air-displacer 23 in the cylinder 10, said rod being guided by a hollow post 24, forming a part of casting 13. The piston 25 of cylinder 14 is connected by pitman 26 with a notched or toothed crank-wheel 27 at the opposite end of shaft 16, said wheel being cast integral with a fly-wheel 28, also serving as a belt-wheel for driving the blower of the air-supplying device.

The air-supplying device consists of a blower 29, inclosed within a chamber 30, formed by the casting 18 and provided with a detachable cover 31, having a central opening 32 for the admission of air to the blower, as shown in Fig. 3. The blower 29 is a series of fans 33, tangentially arranged on a shaft 34, mounted in a bearing in the casting 18, the entire set of fans being formed from a single piece of sheet metal cut and bent as clearly illustrated in Fig. 5. Attached to shaft 34 upon the outside of the blower-chamber is a pulley 35, which is connected by a belt 36 with the fly-wheel 28 of the motor. The blower-chamber is provided with an air-outlet 37, communicating with a pipe 38, tapped into the casting 18 and communicating with the burner 1. Around a portion of the periphery or outer edge of casting 18 is a gas duct or passage 39, leading from the main gas-supply pipe 40, which is tapped into the upper portion of the casting to the opening 37, connecting the blower-chamber with the pipe 38. Pipe 40 is to be attached to a gas-service pipe and is provided with a two-way cock 41 for controlling the supply of gas to the burner 1 and also to a pilot and heating burner 42, to be hereinafter referred to.

It is now to be understood that when heat is applied to the lower end of cylinder 10 the expansion of air therein will cause piston 25 to rise for rotating shaft 16, and the latter will operate through the displacer 23 to shift the air from the bottom to the top of the cylinder, where it will contract, because of the difference in temperature at that end of the cylinder, to permit and aid in the descent of the piston 25. The descent of piston 25 causes the air to be displaced from the cool to the hot end of the cylinder 10, when expansion again takes place as before, the motor being thus kept in continuous operation.

The blower 29 should be revolved at a much higher rate of speed than can be attained by the motor, and while gearing may be relied upon as the connecting means I have adopted a belt and pulley as being much simpler and less liable to require attention; but it is important where a belt is used to provide an automatic belt-tightener to compensate for variations in the belt due to variations in temperature. In the apparatus shown I provide a gravity belt-tightener consisting of a roller 43, mounted on the end of an arm 44, which is pivotally mounted on the casting 18 and weighted, as at 45, for causing the roller to bear upon the belt with constant pressure sufficient to compensate for variations in the belt or in other portions of the apparatus.

The revolution of the blower causes air to be forced into the pipe 38, leading to the burner 1, said air being mixed with the gas also entering said pipe from the pipe 40 through the passage 39. The pressure and quantity of air supplied to the burner is regulated by the quantity permitted to enter the blower-chamber, this being regulated by a slide or damper 46, controlling the opening or air-inlet 32, provided in the detachable cover 31, as illustrated in Fig. 3.

Adjacent to the bottom of cylinder 10 there is a burner 42, that performs service as a pilot-burner for igniting the main burner 1 and also as a burner for initially heating the cylinder 10 preparatory to starting the apparatus. Said burner is at the end of a tube 47, connected to the two-way cock 41, and in said tube, near its lower end, there is an opening 48 (see Fig. 7) for the admission of air, which is drawn into the tube by the gas when the latter is supplied under sufficient pressure. A small quantity of gas is continuously supplied to the tube 47 through a by-pass 49 in the cock 41, the quantity being regulated by a screw 50. (Shown in Figs. 8, 9, and 10.) The gas thus permitted to pass to the burner 42 is kept continuously burning for igniting the main burner 1 and also for heating the cylinder 10, as will be explained. As shown in Fig. 8, the plug 51 of cock 41 is provided with a main gas-passage 52 and a branch passage 53, which are both closed to the passage of gas when the plug is turned in the position indicated in said figure. When the plug is turned to the position shown in Fig. 9, gas enters tube 47 under full pressure, and burner 42 then acts as a Bunsen burner for heating cylinder 10, air being drawn to the burner through the opening 48 in tube 47, as already explained. When plug 51 is turned to the position shown in Fig. 10, the full pressure of gas is cut off from burner 42, which again becomes a mere pilot-burner, and gas is permitted to pass from pipe 40 through duct 39 and pipe 38 to the main burner, which is immediately ignited by the flame from the pilot-burner. Cock 41 is operated by chains 54 and 55, attached to a bell-crank lever 56, secured to the plug of the cock, as shown in Fig. 3. Chain 54 is the chain for opening the cock and passes from the bell-crank lever 56 through a hole in a guide 57, forming a part of the casting 18. When it is desired to start the apparatus, chain 54 is pulled until it is seen that burner 42 is burning with sufficient power to quickly heat cylinder 10, the cock being then in the position indicated in Fig. 9. After cylinder 10 has become heated sufficiently chain 54 is pulled until an adjustable stop 58, secured thereto, comes in contact with the guide 57, the cock being then open for the passage of gas to the main burner and closed for preventing a full flow of gas to the burner 42, which now acts simply as a pilot-burner for the main burner. Cock 41 is brought to the position indicated in Fig. 8 for shutting off the gas-supply and stopping the apparatus by pulling chain 55.

After the motor has been heated by the Bunsen burner it is necessary to start the motor in some manner before the apparatus can be set in motion. For this purpose I have devised starting mechanism, consisting of an arm 59, pivoted at one end, as at 60, to a second arm 61, which latter is itself pivoted to a stud 62 on the casting 18, as shown in Fig. 2. Arm 59 is provided with teeth 63, which engage the teeth on the crank-wheel 27 and start the motor, as will presently appear. The free end of arm 59 is attached to and supported by a chain 64, which passes through a second hole in the guide 57 and which is attached to the chain 54 at 65, as shown in Fig. 4. Arm 59 is held in its normal or rearward position by a spring 66, attached to arm 61, and by its own weight it rests slightly below the position it first assumes when pulled by the chain 64. When chain 54 is pulled for opening the cock 41 and converting the pilot-burner into a Bunsen burner, chain 64, being attached thereto, is also pulled; but as the pull is slight arm 59 is not moved forward sufficiently to start the motor and is quickly returned to its normal position by the spring 66, acting on arm 61. After cylinder 10 has been heated chain 54 is pulled for turning on gas to the main burner, and this being done with a strong quick motion chain 64 first raises and then pulls arm 59 quickly across the periphery of wheel 27, the teeth on the arm engaging the teeth on the wheel and turning it for starting the motor, as will be readily understood. When the chain is released, arm 59 drops away from wheel 27 and is returned to its original position without contact with wheel 27 and may again be pulled forward in the same manner without disturbing cock 41, which remains open until closed by a pull on the chain 55.

The motor being located above the burner 1, it is important that provision be made for insuring a proper difference in temperatures between the two ends of cylinder 10, as well as to prevent products of combustion from entering the blower-chamber. For this purpose I have provided a heat-insulator 9, which surrounds the lower end of cylinder 10, as shown in Fig. 1. Said insulator consists of a series of diaphragms 68 68 and 69, separated from each other by ventilated spaces 70 and preferably made in progressive sizes and arranged so that the largest will project over and beyond the edge of the one next underlying it and the latter project beyond the next underlying it, and so on to the smallest, which is placed at the bottom or nearest to the burner. The diaphragms 68 68, of which there may be any number, are composed of asbestos or other heat-insulating material and are supported by a dish-shaped casting 67, provided with openings 71 for affording free circulation of air between the diaphragms. Casting 67 is also provided with a sleeve 72, by means of which it is secured to the pipe 38 by a set-screw, as clearly shown. The upper diaphragm 69 is composed of sheet metal and made conical in form, with its outer edge bent downwardly to fit over the edge of the casting 67, said diaphragm thus serving as a cover for said casting. The conical reflector 7 serves also to direct heat from the burner to the exposed end of cylinder 10 through the opening 73.

For oiling the bearings and movable parts of the apparatus I provide a single oil-cup 74, from which the parts requiring oil are fed by wicks supported in tubes 75, the entire apparatus being thus kept in good running order, with necessary attention reduced to a minimum.

The entire apparatus above the insulator 9 is inclosed within a case or cover consisting of two sheet-metal cylinders of different diameters, 76 and 77, and a conical cover 78. The smaller cylinder 76 is secured to the insulator 9 by angle-irons 79 and raised slightly above the same to afford a ventilating-space 80. The larger cylinder 77 is secured to the upper end of cylinder 76 by irons 81, the space 82 between the two cylinders affording an additional ventilating-space and also as the opening through which the operating or controlling chains 54 and 55 pass to the outside of the casing. The conical cover 78 is secured to the pipe 40, and at its outer edge it is provided with a flange 83, which overhangs the upper edge of cylinder 76 in such a manner as to afford a ventilating-space 84, as clearly shown.

For affording a proper circulation of air through the casing to keep the upper portion of the apparatus as cool as possible I have converted the fly-wheel of the motor into a rotary fan by attaching thereto blades 85, which are secured to the spokes of the wheel and set at a slight angle, as will be readily understood; but of course a fan constructed separately from the motor and driven thereby may be employed, if desired.

Having thus described my invention, what I claim as new, and desire to secure by Letters Patent, is—

1. In an apparatus of the character described, a burner, a motor operated by the heat from said burner, a device or mechanism driven by said motor for supplying air to said burner, means for controlling the fuel-supply to the burner, mechanism for initially starting the motor, and operating connections between said means and starting mechanism, substantially as described.

2. In an apparatus of the character described, a burner, a motor operated by the heat from said burner, a device or mechanism driven by said motor for feeding said burner, a second burner for initially energizing the motor, and a starting device for said motor, substantially as described.

3. In an apparatus of the character described, a burner, a motor operated by the heat from said burner, a device or mechanism driven by said motor for feeding said burner, a second burner for initially energizing the motor, a starting device for said motor, a cock for controlling the main burner, and means for simultaneously opening the cock and operating the starting device, substantially as described.

4. In an apparatus of the character described, a burner, a motor operated by the heat from said burner, a device or mechanism driven by said motor for feeding said burner, a pilot-burner for the main burner, and means for converting said pilot-burner into a heating-burner for initially heating the motor, substantially as described.

5. In an apparatus of the character described, a burner, a motor operated by the heat from said burner, a device or mechanism driven by said motor for feeding said burner, a second burner for initially heating said motor, and a two-way cock for controlling said burners, substantially as described.

6. In an apparatus of the character described, a main burner, a motor operated by the heat from said burner, a device or mechanism driven by said motor for supplying air to said burner, a Bunsen burner located in position to heat said motor and also to ignite the main burner, means whereby gas will be continuously supplied to said Bunsen burner, and means for temporarily increasing said supply, substantially as and for the purposes specified.

7. In an apparatus of the character described, a burner, a motor operated by the heat from said burner, a device or mechanism driven by said motor for feeding said burner, a second burner for initially heating the motor, means for opening a common fuel-supply pipe to said second burner and thereafter closing it and opening it to the main burner, a starting device for the motor, and means whereby said device will be actuated by the means controlling the fuel-supply when the latter is establishing the fuel connection to the main burner, substantially as described.

8. In an apparatus of the character described, a burner, a motor operated by the heat from said burner, a device or mechanism driven by said motor for feeding said burner, a cock for controlling the gas-supply to the burner, means for opening and closing said cock, and starting mechanism for the motor operatively connected to said means, substantially as described.

9. In an apparatus of the character described, a burner, a motor, a device or mechanism driven by said motor for feeding said burner, a cock for controlling the fuel-supply to said burner, a chain attached to said cock for opening the same, mechanism connected to said chain for starting the motor, and means for returning the starting mechanism to its normal or original position after said chain has been pulled, substantially as described.

10. In an apparatus of the character described, a burner, a motor operated by the heat from said burner, a device or mechanism driven by said motor for supplying air to said burner, a cock for controlling the gas supplied to said burner, a chain attached to said cock for opening the same, mechanism operatively connected to said chain for starting the motor, and adjustable means for limiting the movement of said chain, substantially as described.

11. In an apparatus of the character described, a burner, a device or mechanism for feeding said burner, an air-motor for driving said mechanism having an air-expanding cylinder located in position to be heated by said burner, and a heat-insulator surrounding said cylinder and consisting of a plurality of diaphragms arranged one above another and separated from each other by ventilated spaces, substantially as described.

12. In an apparatus of the character described, a burner, a device or mechanism for feeding said burner, an air-motor for driving said mechanism having an air-expanding cylinder located in position to be heated by said burner, and a heat-insulator surrounding said cylinder consisting of a plurality of diaphragms arranged one above another separated from each other and progressing in size from the lowest to the highest, substantially as described.

13. In an apparatus of the character described, a burner, a device or mechanism for feeding said burner, an air-motor for driving said mechanism having an air-expanding cylinder located in position to be heated by said burner, and a heat-insulator surrounding said cylinder consisting of a dish-shaped casting separated into horizontal spaces by heat-insulating partitions and provided with a conical cover, substantially as described.

14. In an apparatus of the character described, a main burner, a motor operated by the heat from said burner, means driven by said motor for feeding said burner, a second burner adapted to be supplied with fuel, means for admitting fuel to said first burner, said last means operating to decrease the supply of fuel to said second burner, substantially as described.

15. In an apparatus of the character described, a burner, a device or mechanism for feeding said burner, a motor operated by the heat from said burner for driving said device, and means also driven by the motor for creating a current of air for cooling a portion of the apparatus, substantially as described.

16. In an apparatus of the character described, a burner, a device or mechanism for feeding said burner, a motor operated by the heat from said burner for driving said device, and fan-blades attached to a rotating part of the motor for creating a current of air across a portion of the apparatus, substantially as described.

17. In an apparatus of the character described, a burner, a motor operated by the heat from said burner independently of the upward current of air from the burner, a blower driven by the motor for supplying air to said burner, a chamber which said blower occupies, a cover for the apparatus, and means operated by the motor for creating a current of air outside the blower-chamber but within said case, substantially as described.

18. In an apparatus of the character described, a burner, a device or mechanism for feeding said burner, an air-motor for driving said mechanism having an air-expanding cylinder located in position to be heated by said burner, and a heat-insulator surrounding said cylinder and consisting of a dish-shaped casting divided into separate horizontal spaces by heat-insulating partitions, openings into said spaces, and a cover for said casting, substantially as described.

19. In an apparatus of the character described, a main burner, a motor operated by the heat from said burner, means operated by said motor for feeding said burner, a pilot-burner, means for controlling the admission of fuel to said main burner, and means independent thereof for regulating the supply of fuel to the pilot-burner, substantially as described.

20. In an apparatus of the character described, in combination, a main burner, a pilot-burner and a two-way cock which may admit fuel to either of said burners, a by-pass within said cock, means independent of the plug of said cock for controlling the supply of fuel passing through said by-pass, and a starting device for said motor, substantially as described.

21. In an apparatus of the character described, a burner, a vertical pipe for supplying commingled air and gas thereto, a blower-chamber at the upper end of said pipe communicating therewith, a gas-passage communicating with said pipe, a blower in said chamber, a heat-motor for operating said blower, said heat-motor including a vertical cylinder terminating above said burner, a ventilated diaphragm supported by said vertical pipe near the lower end of said cylinder, and a heating-burner located so as to heat the lower end of the cylinder and connected by a pipe extending through said diaphragm and communicating with the main gas-supply above the blower-chamber, substantially as described.

22. In an apparatus of the character described, a burner, a motor, a device or mechanism driven by the motor for feeding said burner, means for governing the supply of fuel to the burner, mechanism for initially starting the motor, and operating connections between the means and starting mechanism, substantially as described.

In testimony whereof I have hereunto set my hand in presence of two subscribing witnesses.

THOS. J. LITLE, JR.

Witnesses:
C. A. NEALE,
W. S. CHASE.